March 11, 1941.　　P. M. BUNDY ET AL　　2,234,396
WELDING CLAMP
Filed Feb. 16, 1938　　2 Sheets-Sheet 1

Inventors
Paul M. Bundy
Alcide E. Beaudett

Munn, Anderson & Liddy
Attorneys

March 11, 1941. P. M. BUNDY ET AL 2,234,396
WELDING CLAMP
Filed Feb. 16, 1938 2 Sheets-Sheet 2
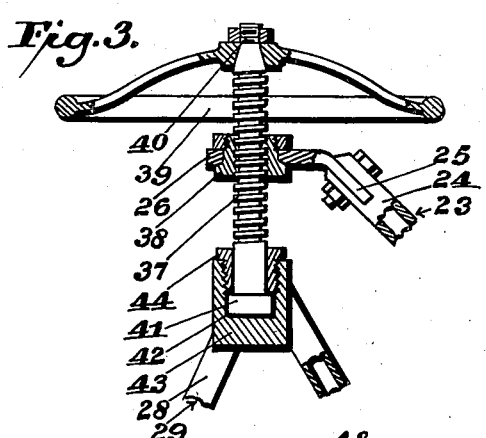
Fig. 3.
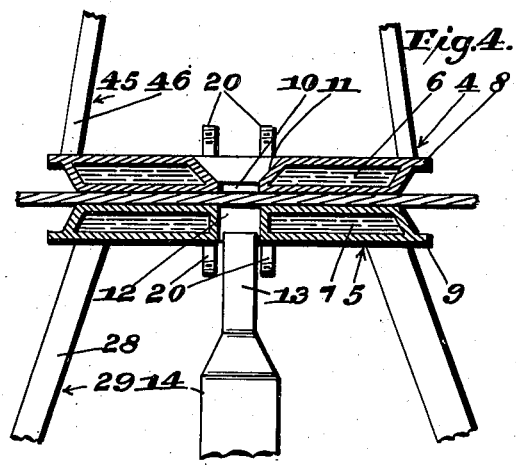
Fig. 4.
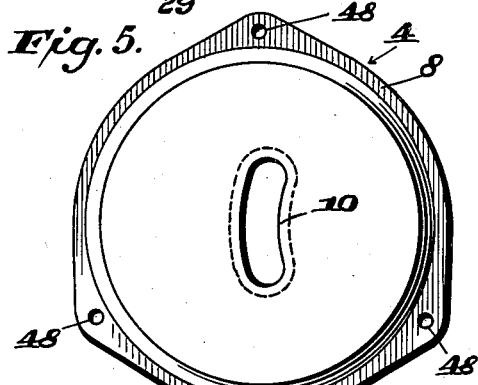
Fig. 5.
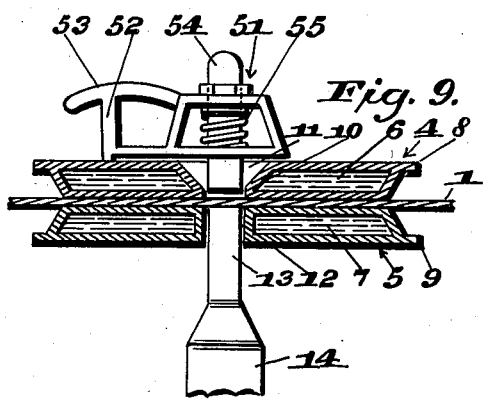
Fig. 9.
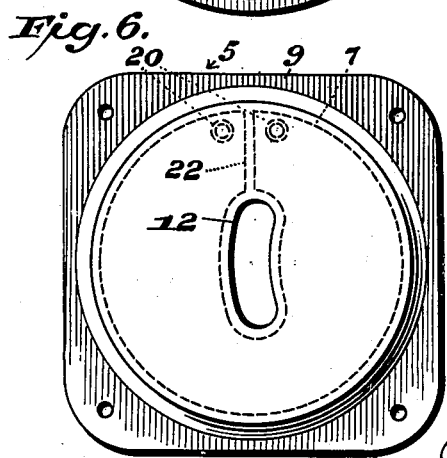
Fig. 6.
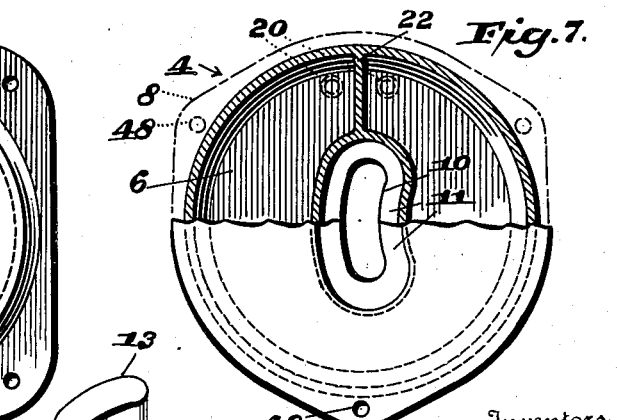
Fig. 7.
Fig. 8.
Inventors
Paul M. Bundy
Alcide E. Beaudett.
Munn, Anderson & Liddy
Attorneys Patented Mar. 11, 1941

2,234,396

UNITED STATES PATENT OFFICE 2,234,396

WELDING CLAMP

Paul M. Bundy and Alcide E. Beaudett,
Albuquerque, N. Mex.

Application February 16, 1938, Serial No. 190,846

7 Claims. (Cl. 78—82)

This invention relates to the art of welding, and has particular reference to a clamp for use in practicing the art. Although this clamp is particularly intended for use in welding circular saw blades, yet it is not so restricted because its use can be extended to a wide variety of metal sheets which have become fractured, and therefore subject to mending or welding.

For the purpose of this disclosure and for the purpose of adhering to the one use of the invention, it is desired to explain that one of the difficulties in welding circular saw blades is the spreading of the heat throughout relatively wide areas around the fracture, thereby causing undue expansion and contraction of the metal with resulting buckling and setting up of internal strains. Further, the welding operation, particularly when it involves molten steel, becomes faulty because the exposure of the molten steel to the air sets up such a chemical combination as tends to make the steel brittle, and consequently, weak.

It has been discovered that a fractured saw blade can be welded most effectively by carrying out the steps of welding on an improved order, one of said steps comprising the use of the improved clamp, which is directly responsible for the prevention of undue expansion and contraction. With these conditions in mind, the objects of the invention are as follow:

First, to provide a clamp for especial use in welding circular saws, although its use is not intended to be so confined, one of its main purposes being to confine the heat closely to the fracture, thus preventing undue expansion and contraction of the blade.

Second, to provide a welding clamp wherein the opposite dies of the saw or other blade are abutted by plates which encompass small portions of the fracture, and are watercooled to confine the heat to a small space.

Third, to provide a welding accessory which defines a dead air space in the neighborhood of at least a portion of the molten metal, thus minimizing the chance of its abstracting some of the chemical constituents from the air and entering into combination therewith.

Fourth, to carry out a series of novel steps in making a weld, one of said steps consisting of actively cooling the metal area around the fracture so as to confine the heat to the fracture and thus prevent undue expansion and contraction of the blade.

Other objects and advantages will appear in the following specification, reference being made to the accompanying drawings, in which:

Figure 3 is a vertical section taken on the line 3—3 of Fig. 1.

Figure 4 is a vertical section taken on the line 4—4 of Fig. 2.

Figure 5 is an inverted plan view of the upper pressure plate.

Figure 6 is a plan view of the lower pressure plate.

Figure 7 is a plan view, partly in section, of the upper pressure plate.

Figure 8 is a detail perspective view of a portion of the anvil which is used in conjunction with the lower pressure plate.

Figure 9 is a sectional view similar to Fig. 4 illustrating the use of a so-called flatter.

Figure 2:
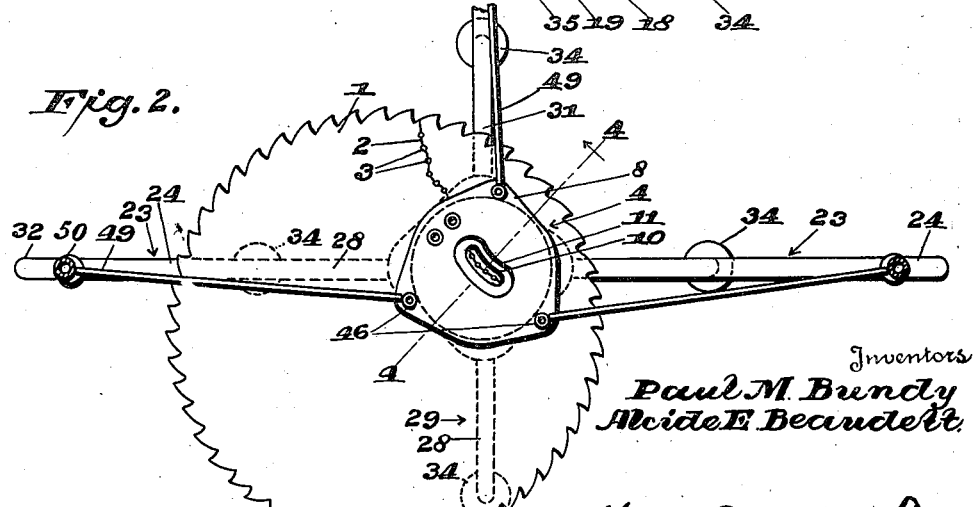
Figure 2 is a horizontal section taken on the line 2—2 of Fig. 1.

In order to make the use of the clamp clearly understood, it is desired to first describe the circular saw blade 1 (Fig. 2) and the steps which are carried out in making a weld. This blade has a fracture at 2. The position of this fracture is, obviously, solely illustrative, it being understood that the fracture may run in any one of a large variety of directions, and may also have caused severance of one or more of the teeth.

Preparatory to welding the blade 1, a series of small holes 3 is drilled in the line of the fracture. The diameter of the holes is somewhere in the neighborhood of 5/32 inch, spaced approximately ½ inch apart, although in practice both the size of the holes and their spacing may and will be varied in accordance with the nature of the crack or fracture.

This plan of drilling a series of small holes along the line of the fracture is adopted mainly on heavy gauge saws such as 10-gauge or thicker. When preparing to weld thinner saws, for example 11-gauge or less, the plan of drilling holes is not carried out, but is substituted by marking the line of the fracture with center punch-marks about every ½ inch apart.

This marking of the fracture either with the punch marks or with the drilled holes has two advantages, first, it enables the welder to follow the line of fracture, second, provision is made for the penetration of the molten welding metal so that a more secure joint is made than would be possible otherwise.

After having prepared the saw in the manner described, the latter is secured in the improved clamp. This clamp has provision for actively cooling the area around the immediate part of the fracture being worked upon, thereby avoiding one of the most disastrous and common faults, namely, the aforesaid undue expansion and contraction of the saw blade.

Reference is now made to the welding clamp. It comprises an upper pressure plate 4 and a lower pressure plate 5. The respective plates have hollow bodies 6, 7 and flanges 8, 9. The upper plate 4 has an opening 10 of an appropriate shape (Fig. 5) which is flared at 11 toward the upper surface so as to readily enable the welder to see the fracture (Fig. 2) and to manipulate the welding means in the opening.

The significance of providing the plate 4 with the opening 10 is to preserve the integrity of the plate. The resulting advantage is that the pressure plate consists of a unit which, when imposed upon the saw blade, makes contact throughout its whole area in a uniform manner. This advantage would not be had were the pressure plate substituted by plural bars or the like.

The lower plate 5 also has an opening 12 usually of the same configuration as the opening 10 (Fig. 6), said openings being defined in each case by a wall which spans the distance between the top and bottom of the respective hollow plate. The opening 12 contains the end of an anvil 13. This anvil has a fairly close sliding fit in the opening 12. Initially it projects into the opening only a small distance (Fig. 4), but in doing so it defines a more or less dead air space under the weld. This is important, as it protects the heated saw from ambient air.

Figure 1:
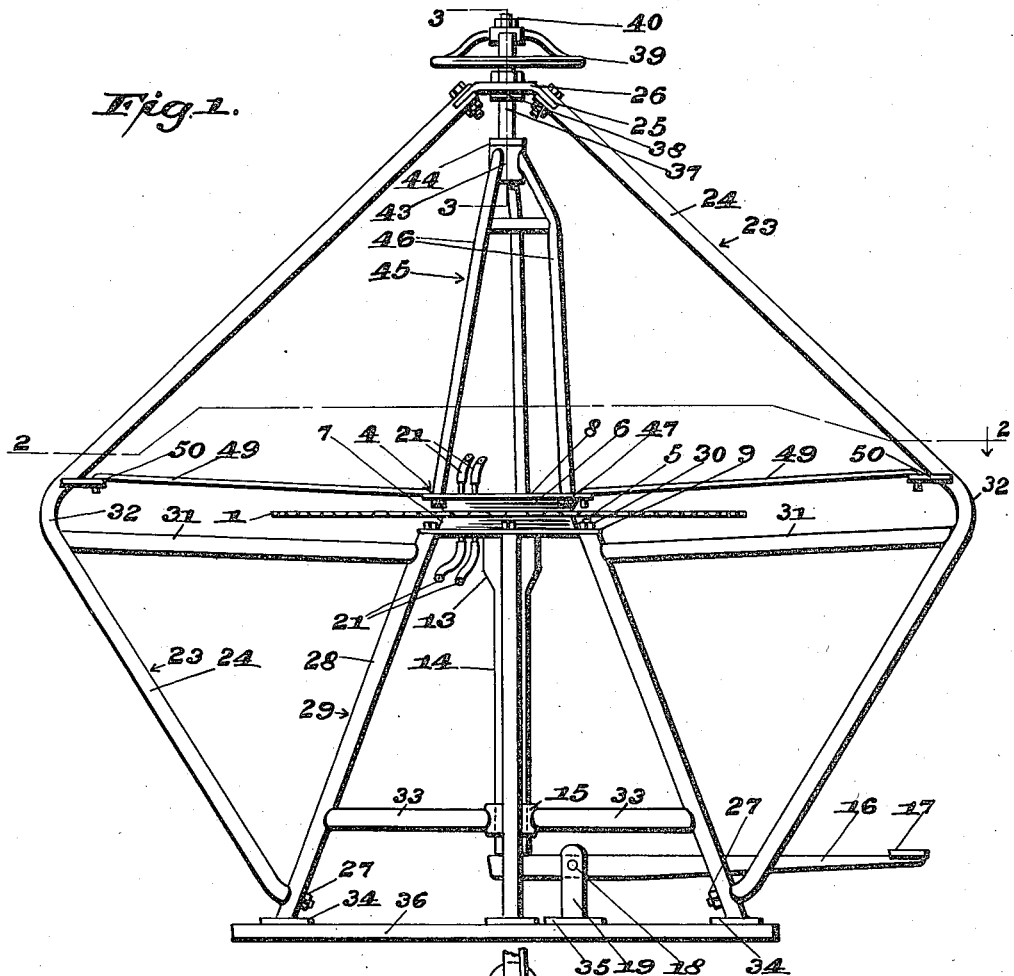
Figure 1 is a side elevation of the improved welding clamp.

The reason for providing this protection is that molten steel when exposed to air, abstracts from it oxygen and nitrogen which enter into chemical combination with the steel forming impurities therein which tend to weaken and embrittle it. The anvil 13 is part of an upright staff 14 which is guided in its vertical movement by at least one bearing 15 (Fig. 1). The lower end of the staff rests upon one end of a treadle 16, the opposite end of which has a foot plate 17. The treadle is pivoted at 18 upon a bracket 19. By stepping upon the plate 17 the anvil 13 is elevated in the opening 12 (Fig. 9) until it comes into contact with the center surface of the saw blade 1.

Pairs of nipples 20 are screwed into each of the plates 4, 5 (Fig. 4) for the attachment of rubber or other hose connections 21 (Fig. 1). These hose connections provide for the passage of water through the hollow bodies 6, 7. Each of the latter is divided by a fin 22 (Figs. 6, 7) and since the respective ones of the nipple pairs 20 are screwed into the plates on the respective sides of the fin 22, it follows that the incoming water will be directed through the longest possible path around the wall of the respective opening.

The provision of the water jackets 6, 7 comprises one of the fundamental purposes of the invention. The underlying idea is to confine the welding heat virtually to that much of the fracture 2 which is exposed in the opening 10. By thus confining the welding heat to a relatively small space the undue expansion and contraction of the saw blade is prevented.

The clamping means by which the plates 4, 5, are forced into tight engagement with the saw blade 1 comprises a frame 23, the bent members 24 of which are coupled at their upper ends at 25 to a plate 26 (Fig. 3) and secured at 27 at their lower ends to the legs 28 of a part which constitutes a stand 29.

This stand has the lower plate 5 secured to it by virtue of the bolts 30, or their equivalents, being screwed through the flange 9 into the legs 28. The latter have braces 31 which extend out to the members 24, the regions of bending 32 of the latter being confined to places immediately above the braces 31. The legs 28 have arms 33 which extend inwardly and fixedly carry the bearing 15. Said legs and the bracket 19 have the floor plates 34, 35, respectively, which may either by secured to the floor of a shop or to an auxiliary base 36 which will enable the moving of the apparatus from place to place where needed.

The foregoing clamping means, in addition to the frame 23 and its associated parts, includes a screw 37 (Fig. 3) which is threaded in a bushing 38 that is fixedly carried by the plate 26. The upper end of the screw has a hand wheel 39 secured to it at 40. Its lower end has a head 41 which is turnably held in the socket 42 of a block 43 by a hollow nut 44.

Said block 43 is carried by an auxiliary frame 45 the individual members 46 of which have the upper plate 4 secured to them by bolts 47 which are screwed thereinto through the flange 8. The latter has uniformly spaced holes 48 (Fig. 5) to which the inner ends of guide rods 49 are attached. The outer ends of these rods are set in brackets 50 which project from the members 24.

Reference is made to Fig. 9 which illustrates a flatter 51 that is used in conjunction with the clamp. This so-called flatter comprises a portable frame 52 which has a handle 53 by means of which the flatter is moved back and forth along the opening 10. The frame movably carries a striker 54 which is normally held up by a spring 55. The striker projects below the frame (Fig. 9). The sides of the opening 10 guide the striker as the flatter is moved from one welded hole to the next. When the striker is centered over each welded hole a blow is imparted to it with a hammer and the hammering is done in such a manner as to flatten and smooth the weld.

Were it not for the use of the flatter 51 and for the manner in which it fits the opening 10, it would be virtually impossible to swage the welds as finished, first, because of heat in the constricted zone in the neighborhood of the opening, second, because of the difficulty that would be experienced in trying to strike blows through the opening. Thus the flatter 51 is an essential part of the clamp itself.

The operation is readily understood. It is first desired to state that the weld is preferably made by the use of oxy-acetylene gas. It is possible to do the welding with either the electric carbon arc or the metallic arc, but each of these instrumentalities requires so much work in preparing a fracture for the welding operation that the gas method is much preferred.

Having prepared the fractured saw blade 1 by either center-punching the fracture 2 or drilling it with holes, said blade is inserted between the upper and lower pressure plates 4, 5. The operator will begin at one end of the fracture, and position the blade 1 so that a portion of the fracture is approximately centered in the upper opening 10. The hand wheel 39 is then turned in the proper direction, the rotation of the screw 37 driving the block 43 downwards, and causing the plate 4 to exert pressure on the saw blade. With the oxy-acetylene torch the welding metal is brought to a fluid state. The operator works from hole to hole or punch-mark to punch-mark, a small amount of metal being added from the filler rod (the welding metal) as the welding proceeds. This will leave a small ridge over the weld along the line of the fracture, and while the metal is still in a somewhat soft state, use is made of the so-called flatter 51 in Fig. 9.

Just before using this flatter the operator actuates the treadle 16, bringing the anvil 13 up firmly against the lower side of the saw (Fig. 9). By repeatedly striking the flatter with a hammer, moving the latter back and forth in the opening 10 and using its side edges as a guide, the welding metal is forged down until the welding becomes flat and smooth.

Each hole is welded in this manner throughout the length of the fracture, or the operator may release the saw and weld a previously treated hole from the other side by reversing the saw. In any case the process is carried out until the fracture is welded on both sides. When the welding is completed the saw will be found to be straight and true with the exception of the small spots along the line of the weld represented by the places where the holes 3 were. These spots are taken care of by using a small electric hand grinder which eliminates any possible high places.

We claim:

1. A welding clamp comprising a pair of respectively fixed and movable pressure plates, pressure means with which to force the movable plate against the adjacent side of a blade emplaced between said plates, said pressure means providing the suspension for said movable plate, one of the plates having an opening preserving the integrity of said plate and serving to admit welding means to a fracture in the blade exposed in said opening.

2. A welding clamp comprising a pair of hollow pressure plates between which a blade is adapted to be emplaced, pressure means with which to force said plates against the opposite sides of said blade, at least one of the plates having a wall situated inwardly of the boundary of said plate, spanning the distance from top to bottom of the respective plate and defining an opening to admit welding means to a fracture in said blade exposed in said opening, and means with which to circulate a cooling fluid through the hollow plates to confine the heat of the welding means to that much of the fracture exposed in the opening.

3. In a welding clamp, a hollow pressure plate substantially centrally walled to define an opening, a fin extending from the central wall to the outer wall of the plate, and means connected to the plate and communicating with the interior thereof on each of the opposite sides of said fin for the inflow and outflow of cooling fluid.

4. A welding clamp comprising a pair of pressure plates having registering openings, a frame including a stand rigidly carrying one of the plates for the reception of a blade which has a fracture, a portion of which comes within the zone of the openings, and clamping means pendant from the frame and carrying the other plate and being operable to force it down upon the blade to hold the blade stationary during a welding operation through the respective opening.

5. A welding clamp comprising a pair of pressure plates having registering openings, means which rigidly supports one of the plates, said means including at least one member, a plate to which said member is coupled and having a bushing, a pressure screw threaded in said bushing, an auxiliary frame having the other plate connected thereto and in turn being swivelly connected to the pressure screw, and means by which to turn the screw so as to move the auxiliary frame and its plate toward and from the rigid plate.

6. A welding clamp comprising a pair of pressure plates having registering openings, means which rigidly supports one of the plates, said means including at least one member, a plate to which said member is coupled and having a bushing, a pressure screw threaded in said bushing, an auxiliary frame having the other plate connected thereto and in turn being swivelly connected to the pressure screw, means by which to turn the screw so as to move the auxiliary frame and its plate toward and from the rigid plate, and a guide rod connected at its ends to said member and to the movable plate.

7. A welding clamp comprising a rigid frame including a stand, a pair of pressure plates of which one is affixed to the stand, an auxiliary frame to the bottom end of which the other pressure plate is affixed in superimposed relationship to the stand-affixed pressure plate, said plates having registering openings, pressure means operably mounted upon the frame, said means having a loose coupling with the top of the auxiliary frame, an anvil normally partly projecting into the opening of the stand-affixed pressure plate, said anvil including an upright staff, and a treadle pivoted in respect to the frame having one of its ends in position to move the staff and thus shift the anvil in its opening.

PAUL M. BUNDY.
ALCIDE E. BEAUDETT.